United States Patent

Luedeke et al.

[11] Patent Number: 5,727,988
[45] Date of Patent: Mar. 17, 1998

[54] METHOD AND APPARATUS FOR LOCATING AND HOLDING A WORK PIECE

[75] Inventors: Arthur P. Luedeke, Marine on St. Croix; Bradley W. Keller, Forest Lake; Andrew A. Larson, St. Paul, all of Minn.

[73] Assignee: Minnesota Mining and Manufacturing Company, St. Paul, Minn.

[21] Appl. No.: 567,840

[22] Filed: Dec. 6, 1995

[51] Int. Cl.[6] ..................................... B24B 1/00
[52] U.S. Cl. .................. 451/28; 451/398; 451/365
[58] Field of Search ........................ 451/365, 379, 451/385, 397, 398, 402, 28; 269/156, 71

[56] References Cited

U.S. PATENT DOCUMENTS

| | | | |
|---|---|---|---|
| 1,510,764 | 10/1924 | Causey. | |
| 1,993,064 | 3/1935 | Blanc | 51/100 |
| 2,152,875 | 4/1939 | Cramer | 51/165 |
| 2,307,407 | 1/1943 | Imelmann | 51/97 |
| 2,577,393 | 12/1951 | Yulich | 51/33 |
| 2,701,429 | 2/1955 | Hartridge | 451/398 |
| 2,712,449 | 7/1955 | Grobey | 451/398 |
| 2,802,310 | 8/1957 | Chaplik | 451/365 |
| 3,066,457 | 12/1962 | Moore | 451/398 |
| 3,106,047 | 10/1963 | Tomlinson | 451/398 |
| 3,818,647 | 6/1974 | Geonnotti | 451/398 |
| 3,820,286 | 6/1974 | Burch | 51/97 R |
| 3,821,867 | 7/1974 | Hinkeler et al. | 451/398 |
| 3,941,363 | 3/1976 | Ogg | 451/365 |
| 3,948,144 | 4/1976 | Nagano | 90/20 |
| 4,054,009 | 10/1977 | Redko et al. | 51/3 |
| 4,769,952 | 9/1988 | Pedriai | 51/33 R |
| 4,832,326 | 5/1989 | Niedecker | 269/329 |
| 4,833,831 | 5/1989 | Armstrong, Jr. | 451/365 |
| 4,987,701 | 1/1991 | Humbert | 451/385 |
| 5,101,601 | 4/1992 | Funnell | 51/165.77 |
| 5,489,089 | 2/1996 | Vollrath et al. | 269/71 |
| 5,494,303 | 2/1996 | Darling | 279/5 |

*Primary Examiner*—James G. Smith
*Assistant Examiner*—Dona C. Edwards
*Attorney, Agent, or Firm*—Gary L. Griswold; Walter N. Kirn; James J. Trussell

[57] ABSTRACT

An apparatus and method for accurately positioning a wide tolerance work piece, wherein the work piece has a first portion with a known reference surface and a second portion whose position relative to the first portion is not exactly known. The apparatus includes a locating fixture for positioning the first portion of the work piece in a known relationship to the locating fixture. A work piece holding fixture having at least one non-synchronous gripping device conforms to the unknown position of the second portion of the work piece and holds the first portion of the work piece in the known position.

6 Claims, 14 Drawing Sheets

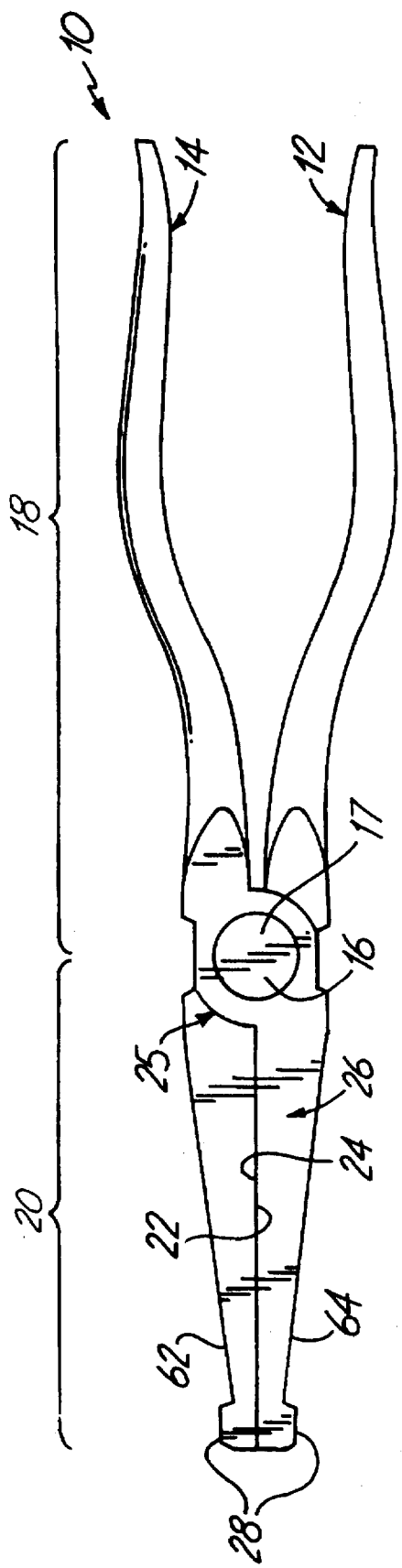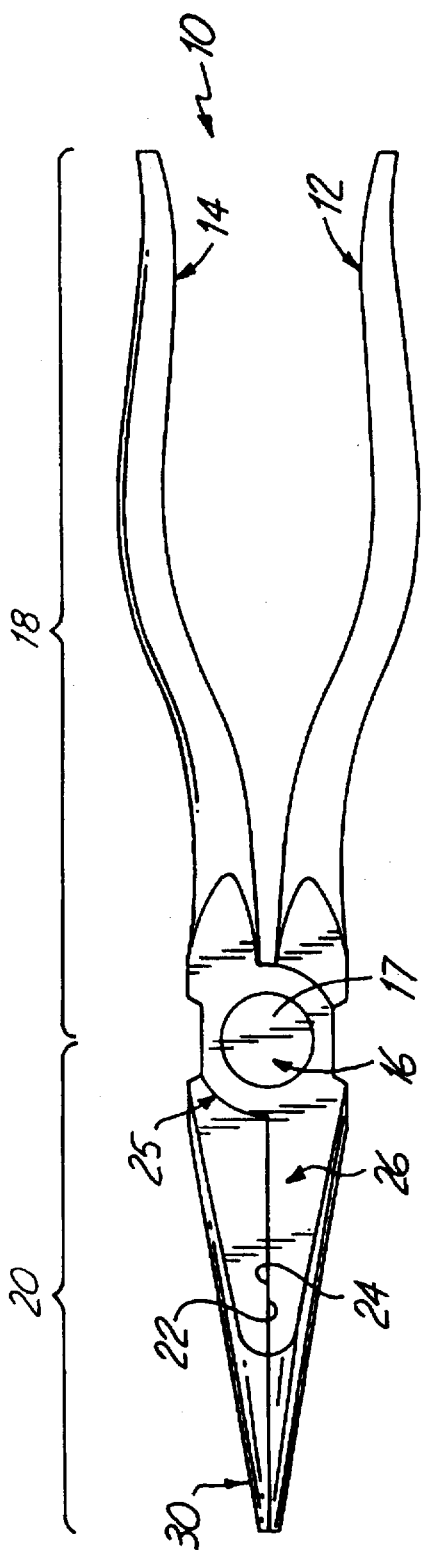
Fig. 2
Fig. 3 ly,727,988

METHOD AND APPARATUS FOR LOCATING AND HOLDING A WORK PIECE

BACKGROUND OF THE INVENTION

This invention relates generally to an apparatus and method for accurately locating and holding a work piece during a machining operation. In particular, the invention relates to a two-assembly fixturing apparatus and method which will locate and hold needle nose pliers during a grinding operation.

A wide variety of devices for locating and holding work pieces during a machining operation are well known in the art. In nearly all of these machining operations, it is important that the work piece being machined is accurately positioned and held such that the machining operation is properly performed. Inaccurate placement or failure to hold the work piece securely typically results in inaccurate machining of the work piece and a product which is either unusable or aesthetically unacceptable, or requires further, usually manual, processing.

Because of the nearly limitless variety of work piece configurations and machining operations, devices which locate and hold work pieces during machining operations must generally be adapted specifically for the particular work piece and machining operation. Thus, while the potential applications of the present invention are broad, the discussion in this application will focus primarily on the machining of hand-held tools and of needle nose pliers in particular. Although the discussion in this application is directed toward the grinding of a tapered surface on needle nose pliers in particular, it is to be understood that the ideas and concepts embodied in the application are easily transferable to other work pieces and machining operations.

Many hand tools, such as pliers and wrenches, are formed by forging. Individual components of the tool are forged and then additional machining operations are performed on those portions of the tool which must have a higher tolerance finish than forging alone can provide. Additional machining on forged tools is common as a result of the forging process. In forging it is difficult to create aesthetically pleasing surfaces, to provide consistently shaped parts with referencable surfaces or uniformly dimensioned parts. This is especially true when dealing with parts that must be assembled to form a tool such as a pliers. For example, the handle portion of a forged tool may not be precisely aligned with the "working end" of the tool, and the alignment of the handle with the "working end" of the tool may vary from tool to tool. For a forged pair of pliers, the position of the gripping portion of the pliers relative to the handles portion may vary by up to 0.125 inches. Thus, the alignment of the handle portion with the working end of the tool may vary noticeably, or may only differ by a few thousandths of an inch. However, it is impossible to predict what the misalignment will be. Although the dimensional tolerances of the forgoing process may not be noticed by the user or affect the performance of the tool, the constantly changing and unknown alignment of the handle portion and the working end of the tool can greatly affect the remaining portion of manufacturing process.

For example, in the manufacture of needle nose pliers the individual halves of the pliers are forged, with each half of the pliers having a handle portion and a gripping portion. After each half of the pliers has been forged, the gripping surfaces are broached to create flat mating surfaces, the halves are riveted together, and the rivet heads and rivet head surfaces are ground parallel to each other and perpendicular to the gripping surfaces. At this point, the tapered surface on the gripping end of the pliers must be formed.

Current technology typically locates the forged plier from the broached notched area behind the rivet and between the apex of the handles, or grasps the handle portion. The center of the tip is visually aligned with a pointer and then clamped. During this process, it is extremely difficult to accurately locate the plier. The plier then rotates while the tapered surface on the gripping end is formed. The tapered surface is typically formed by grinding (usually with an abrasive belt or grinding wheel) but it may also be formed by other material removal means, such as by a lathe. Due to the wide dimensional tolerances of the forged pliers, it is common that the handle portion of the riveted pliers is not perfectly aligned with the broached gripping surfaces of the pliers. Further, the amount and direction of misalignment varies from pliers to pliers. As a consequence, when the pliers are gripped at the handle end and rotated, the gripping end of the pliers may not be rotated exactly about its center, and thus the tapered end is not concentrically ground. The result is an uneven tapered surface on the gripping end. An example of the uneven grinding which results when the pliers is not rotated about its axis is seen in FIGS. 1A and 1B in which one gripping end portion is noticeably smaller than the other portion.

The uneven grinding may make the pliers unusable and at the very least makes the appearance of the pliers unacceptable to many potential purchasers. Thus, to correct the uneven grinding, the pliers must be reworked by hand by an experienced workman to make the pliers take on an acceptable appearance. Nearly every pliers which is initially ground by machine requires at least some amount of hand grinding, making the production of finished pliers extremely labor intensive. Further, the accurate grinding of the pliers by hand requires a great deal of experience to produce an acceptable finished product. The amount of hand work required to produce finished pliers greatly increases the production time and cost of the pliers.

While the above description focuses on the production of needle nose pliers, other forged hand tools undergo a similar process. For example, adjustable wrenches are typically forged, and then the faces of the wrench are machined to finished tolerances. Because the exact location of the face of the adjustable wrench is not known relative to the handle, it poses an extremely difficult area to reference and grind. Again, a great deal of hand work is required to produce the finished wrench.

In both the needle nose pliers grinding example and in the adjustable wrench example, the work piece has a known reference surface (such as a gripping surface) on which the machining operation should be located. The primary difficulty lies in the fact that the reference surface is part of the portion of the tool to be machined, and thus can not be held directly (because it is to be machined). As a result, a portion of the forged tool which does not include the reference surface must be held during the machining process. Because the wide tolerances of the forging process make it impossible to know exactly the relative position between the portion with the reference surface and the portion to be held, it is extremely difficult if not impossible to machine the tool to its finished dimensions without at least some hand work. Thus, what is needed is an apparatus or method which compensates for and adapts to the continually changing position of the portion of the work piece to be held, while maintaining the portion of the work piece to be machined in a known position.

SUMMARY OF THE INVENTION

The present invention is an apparatus and method for accurately positioning a wide tolerance work piece, where the work piece has a first portion with an accurate reference surface and a second portion, wherein the position of the first portion relative to the second portion is not exactly known. The apparatus comprises two fixtures. A work piece locating fixture includes a locating fixture alignment guide, a first reference surface locator adapted to position the first portion of the work piece in a first dimensional plane, a second reference surface locator adapted to position the first portion of the work piece in a second dimensional plane, and a third reference surface locator adapted to position the first portion of the work piece in a third dimensional plane. A work piece holding fixture includes a first gripping mechanism for securing the work piece in the first and third dimensional planes, and a second gripping mechanism for securing the work piece in the second dimensional plane. The second gripping mechanism has a first jaw and a second jaw opposingly positioned and adapted for engaging and disengaging the second portion of the work piece. The jaws are further adapted to engage and secure the second portion of the work piece at any point within the working range of the jaws. The work piece holding fixture further includes an alignment guide adapted to interface with the locating fixture alignment guide.

After the work piece has been positioned in the first fixture such that the reference surface of the work piece is in a known location, the first fixture and the second fixture are aligned such that the second portion of the work piece extends into the second fixture. The gripping mechanisms of the second fixture then grip the work piece and prevent it from moving within the second fixture. The first fixture is then removed from the work piece and the desired machining operation is performed on the first portion of the work piece.

BRIEF DESCRIPTION OF THE DRAWINGS

FIG. 2 is an elevational view of a needle nose pliers after broaching and riveting, and prior to grinding a tapered surface on the gripping portion.

FIG. 3 is an elevational view of the needle nose pliers of FIG. 2, after the tapered surface has been ground on the gripping portion.

DETAILED DESCRIPTION OF THE PREFERRED EMBODIMENTS

Figure 1A:
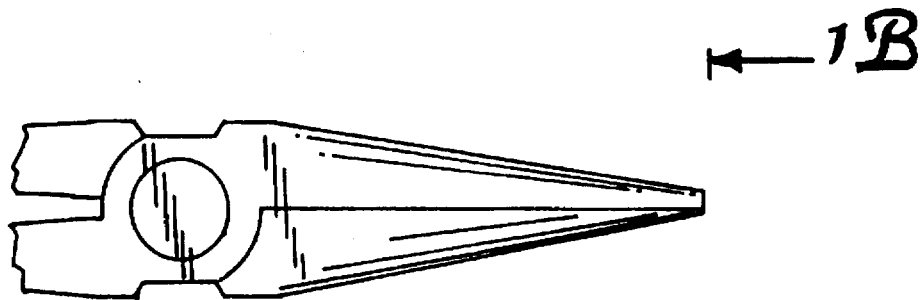
FIG. 1 is an elevational view of the gripping portion of a prior art needle nose pliers, showing non-concentric grinding of the tapered surface.
FIG. 1B is an enlarged view of the end portion of the pliers of FIG. 1A taken along line 1B—1B.
Figure 1B:

The present invention is an apparatus and method for locating and holding needle nose pliers during a material removal operation. Although the description of the invention focuses on locating and holding needle nose pliers during a grinding operation, the concepts and ideas of the present invention are easily transferrable to numerous other work pieces to be operated upon. Particularly, the present invention is easily adaptable to those work pieces in which the exact position of the portion of the work piece to be machined relative to the portion of the work piece to be held during the machining operation is not exactly known. In addition, although the material removal referred to in the description of the invention focuses on grinding the work piece, the material removal can be accomplished by many means, for example, a coated abrasive, a grinding wheel, or a single point tool, to name a few.

Coated abrasives comprise a backing (usually a flexible backing) having abrasive particles adhered thereon. Typically the abrasive particles are adhered with an organic resin binder system to the backing, but in organic binders such as metals (e.g., nickel) can also be used. The backing used can be, for example, a woven or knitted cloth, paper, or a lofty non-woven material. Grinding wheels are also typically referred to as bonded abrasives. Grinding wheels typically comprise a binder and abrasive particles bonded together to form a wheel. The binders used can be resinist, ceramic or glass.

As is common in the manufacture of needle nose pliers, the individual halves of the pliers are forged, the gripping surfaces are broached and knurled, the individual halves are riveted together, and the rivet heads and rivet head surfaces ground parallel and perpendicular to the gripping surfaces. A tapered surface is then ground on the gripping end of the pliers. The present description focuses on the operation of locating and holding the pliers while the tapered surface is being ground.

FIG. 2 illustrates a pliers 10 after broaching and riveting, but prior to the grinding of a tapered surface. The pliers 10 include a first half 12 and a second half 14 which are held together by a rivet 16. Rivet 16 has a large diameter rivet head 17 and a small diameter rivet head (not shown) opposite large diameter rivet head 17. The small diameter rivet head is fastened to first half 12 of pliers 10, while second half 14 of pliers 10 pivots about rivet 16. The pliers 10 further include a handle portion 18 and a gripping portion 20. The gripping portion 20 includes gripping surface 22 on first half 12 and gripping surface 24 on second half 14. In FIG. 2, gripping surfaces 22 and 24 have been broached prior to riveting such that gripping surfaces 22 and 24 are fiat and true surfaces, thereby allowing the surfaces 22, 24 to meet evenly. The broaching operation also creates a radiused surface 25 between gripping surfaces 22, 24 near rivet 16, thereby allowing the halves 12, 14 of pliers 10 to pivot smoothly about rivet 16.

As seen in FIG. 2, gripping portion 20 includes parallel ground sides 26 and backing pieces 28. Backing pieces 28 are used during the broaching process, prior to the riveting of first half 12 and second half 14 of the pliers. Backing pieces 28 are required for additional support during the broaching process and for when gripping surfaces 22 and 24 are knurled. Backing pieces 28 are ground off during the finishing process.

FIG. 3 illustrates pliers 10 of FIG. 2 with a tapered surface 30 ground on gripping portion 20. In accordance with the present invention, tapered 30 surface is concentrically ground about the mating gripping surfaces 22, 24.

First Embodiment of the Invention

Figure 7:
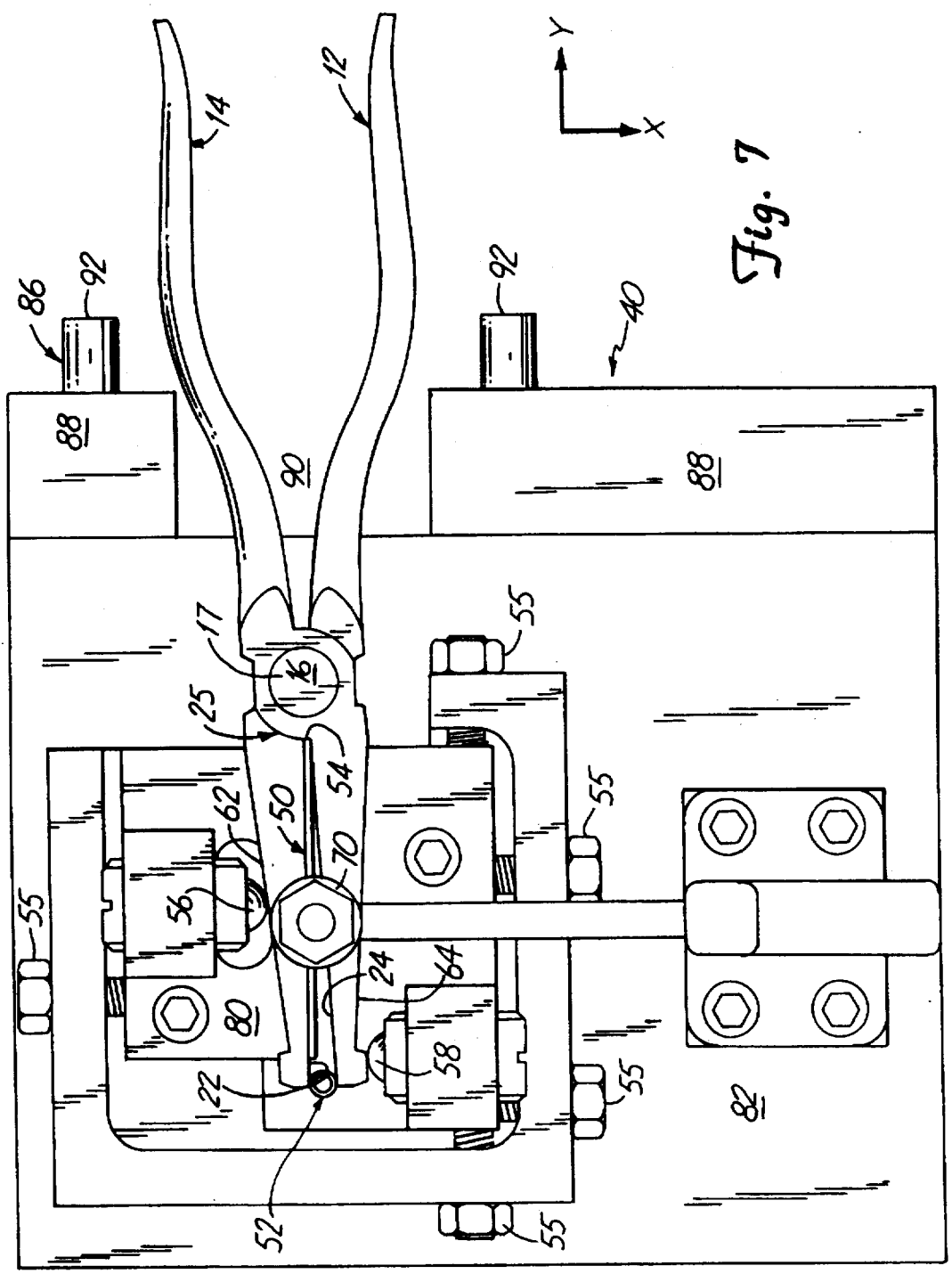
FIG. 7 is a top plane view of the locating fixture of the present invention with the pliers positioned in the locating fixture.
Figure 8:
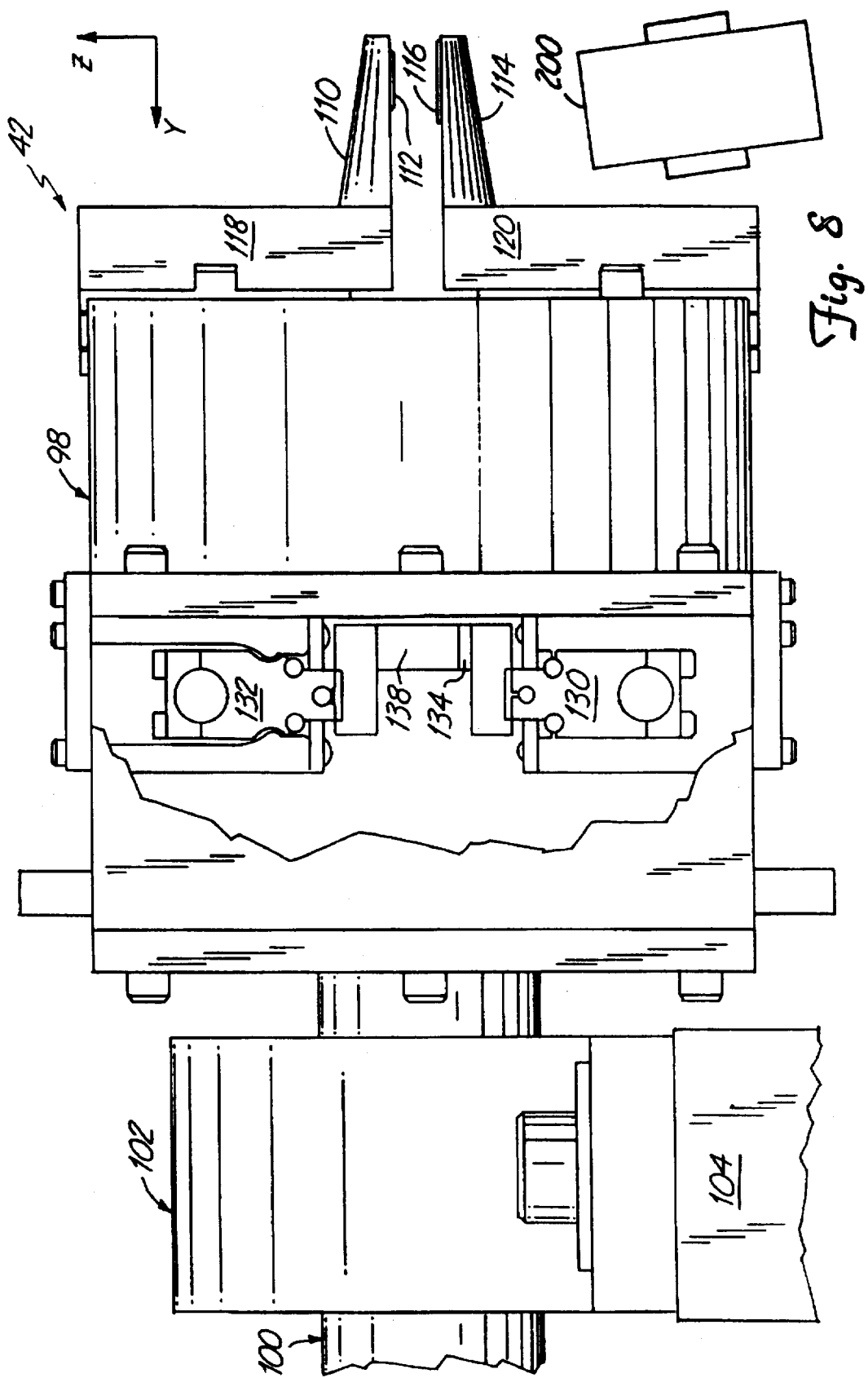
FIG. 8 is a side elevational view of the holding fixture of the present invention.
Figure 9:
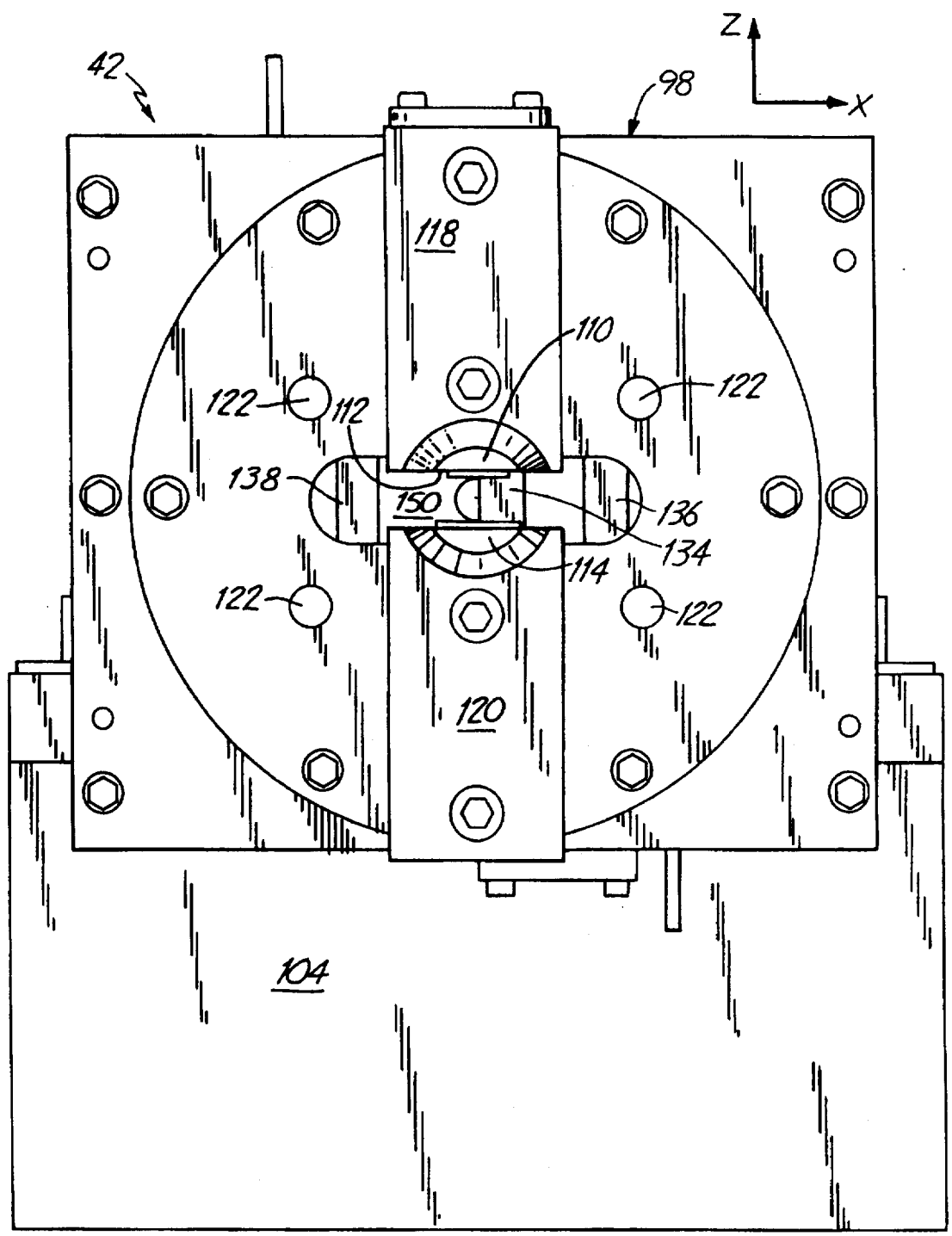
FIG. 9 is a front elevational view of the holding fixture of the present invention.

A first embodiment of the apparatus of the present invention includes a locating fixture 40 as seen in FIGS. 4–7 and a holding fixture 42 as seen in FIGS. 8–9. Locating fixture 40 locates gripping portion 20 of pliers 10 while "handles portion" 18 is transferred into holding fixture 42. Holding fixture 42 holds and rotates pliers 10 while tapered surface 30 on gripping portion 20 is ground. It is also within the scope of the present invention that holding fixture 42 holds pliers 10 static while a suitable grinding apparatus forms tapered surface 30.

Locating fixture 40 uses known reference surfaces on gripping portion 20 to accurately locate pliers 10. In particular, locating fixture 40 uses parallel ground surfaces 26 containing rivet 16, gripping surface 22 on pliers half 12 to which rivet 16 is securely fastened, and radiused surface 25 between gripping surfaces 22, 24 near rivet 16. For ease of discussion an X,Y,Z coordinate system is shown in the Figures and is used as a directional reference in the description of the invention.

Pliers 10 are seen positioned in locating fixture 40 in FIG. 7. Pliers 10 are loaded in locating fixture 40 with larger diameter rivet head 17 facing upward in the Z-direction. Gripping surface 22 of pliers half 12 (fastened to rivet 16) contacts a locating surface 50 which orients gripping surface 22 in the X-direction. Gripping surface 24 contacts a pin 52 which will keep pliers 10 from completely closing. Finally, radiused surface 25 (between gripping surfaces 22, 24 near rivet 16) abuts an end 54 of first locating surface 10 50, locating gripping surface 22 in the Y-direction. End 54 thus functions as a second locating surface. At this point, gripping surface 22 of pliers 10 is located in a known position in the X-direction and in the Y-direction.

It should be noted that the orientation of locating surfaces 50, 54 may be adjusted using adjustment bolts 55. Preferably, the orientation of locating surfaces 50, 54 is set to a predetermined position using adjustment bolts 55, and then bolts 55 are permanently secured such that the orientation of locating surfaces 50, 54 can not be altered.

To maintain pliers 10 in locating fixture 40 as described above, pliers 10 are held in position by a first force device 56 and a second force device 58. As shown in FIGS. 4–7, force devices 56, 58 are preferably detent balls, but other suitable force devices may be used. Force devices 56, 58 push on surfaces 62, 64, respectively, which are opposite the gripping surfaces 22, 24, respectively. First force device 56 pushes on surface 62 to cause gripping surface 22 to be pushed against first locating surface 50. Second force device 58 pushes on surface 64 and causes gripping surface 24 to be pushed against pin 52. In this manner, gripping surfaces 22, 24 are maintained in contact with locating surface 50 and pin 52 at all times.

After pliers 10 have been loaded into locating fixture 40, a spring backed clamp 70 is actuated and pushes down on parallel ground sides 26 of the pliers 10 midway of the gripping portion 20. As seen best in FIG. 5, clamp 70 contacts parallel ground sides 26 of both plier halves 12 and 14 (shown in phantom). Located directly under clamp 70 is a "floating" locating surface 80 on which pliers 10 are resting. The above-described locating surfaces 50, 54 and force devices 56, 58 are mounted on floating locating surface 80. The surface 80 is slidably connected to a base 82 such that the surface 80 can move (e.g., "float") only in the Z-direction. After clamp 70 is forced against pliers 10, pliers 10 are held securely in place against floating surface 80 and locating surfaces 50, 54. At the same time, floating surface 80 (carrying pliers 10, locating surfaces 50, 54, and force devices 56, 58) is allowed to make small movements in the Z-direction such that pliers 10 are able to move in the Z-direction slightly when they are loaded into holding fixture 42, described in greater detail below. After pliers 10 have been loaded and located in locating fixture 40, they are ready to be transferred to holding fixture 42.

Prior to transferring pliers 10 to holding fixture 42, locating fixture 40 must be properly aligned with holding fixture 42. To properly position locating fixture 40 relative to holding fixture 42, an alignment mechanism 86 is provided on locating fixture 40. Alignment mechanism 86 includes a wall 88 extending in the Z-direction from the base 82. A channel 90 extends through wall 88 and provides space for handles portion 18 of pliers 10 to extend through wall 88. Alignment pins 92 extend from wall 88 to engage mating portions of holding fixture 42, described in greater detail below.

Figure 10:
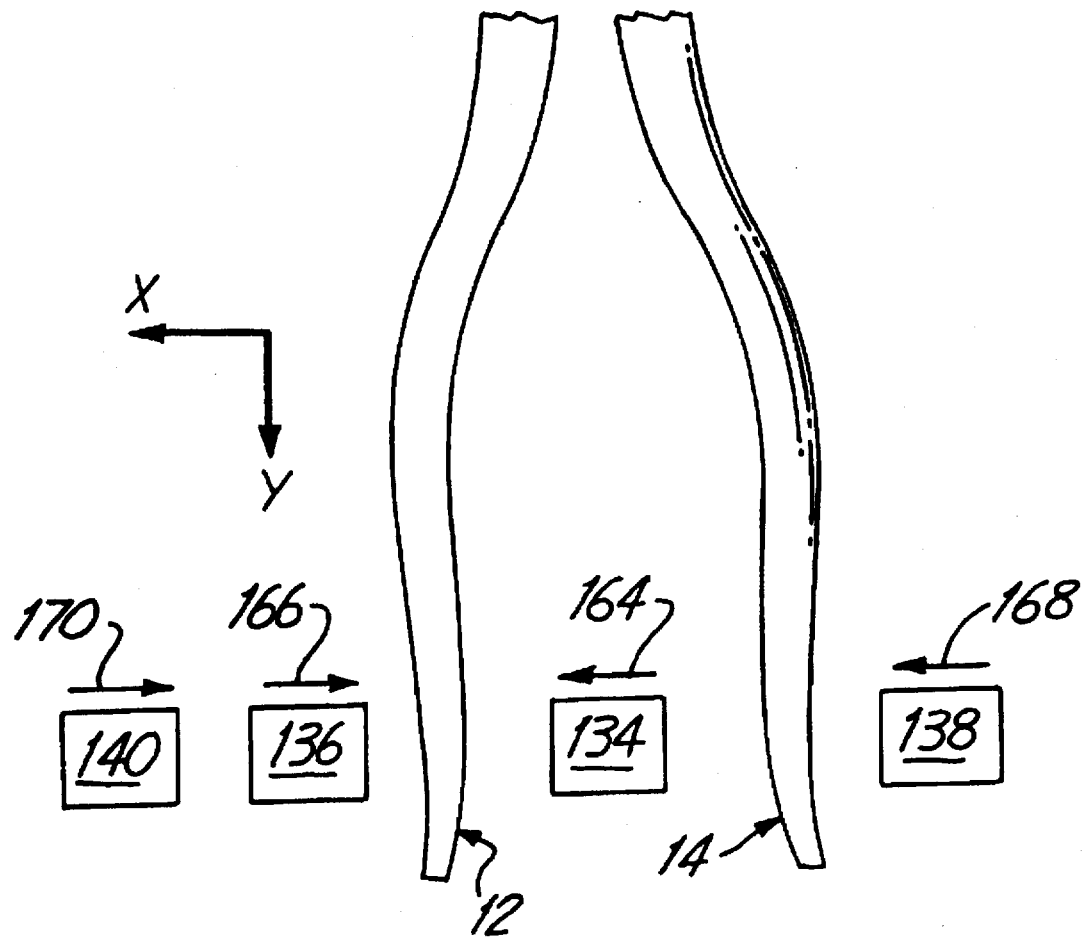
FIG. 10 is a schematic view of the holding fixture of the present invention showing the relative positions of the gripping jaws and the pliers.

Holding fixture 42 is illustrated in FIGS. 8–10. As noted above, holding fixture 42 functions to hold and rotate pliers 10 while tapered surface 30 is ground on gripping portion 20. As best seen in FIG. 8, holding fixture 42 includes a body 98 which is attached to a rotating shaft 100. Shaft 100 is supported by a bearing journal 102 and a base 104. Shaft 100 and body 98 are rotated by a motor (not shown).

Holding fixture 42 has two self-centering jaws best seen in FIG. 8. A first self-centering jaw 110 having a gripping pad 112 is adapted to clamp down on large diameter rivet head 17. A second self-centering jaw 114 having a gripping pad 116 is adapted to clamp on the small rivet head (not shown). First self-centering jaw 110 and second self-centering jaw 114 have base portions 118, 120, respectively.

Base portions 118, 120 cooperatively engage alignment mechanism 86 of locating fixture 40. Specifically, base portions 118, 120 are sized to fit in channel 90 of alignment mechanism 86, such that locating fixture 40 is caused to be properly aligned with holding fixture 42. Alignment holes 122 in holding fixture 42 (best seen in FIG. 9) are positioned to mate with alignment pins 92 on locating fixture 40 to further aid in properly positioning locating fixture 40 relative to holding fixture 42. Collectively, base portions 118, 120 and alignment holes 122 act as an alignment mechanism on holding fixture 42 for aligning holding fixture 42 and locating fixture 40.

Mounted within body 98 are a first non-synchronous gripping device 130 and a second non-synchronous gripping device 132. The non-synchronous gripping devices 130, 132 are preferably of the type manufactured by Zaytran Incorporated of Elyria, Ohio 44036. The non-synchronous grippers are adapted for use in applications where the work piece is held in a fixture or nest and in which the gripper must comply with the position of the work piece.

First non-synchronous gripping device 130 includes jaws 134,136, while second non-synchronous gripping device 132 includes jaws 138,140. Jaws 134, 136, 138, 140 are adapted to grip handles portion 18 of pliers 10 in the manner described below. The positions of jaws 134, 136, 138, 140 relative to pliers 10 are best seen in FIG. 10. Non-synchronous gripping devices 130, 132 are powered by hydraulic lines (not shown) which are selectively controlled to operate gripping devices 130, 132.

In operation, pliers 10 are placed into holding fixture 42 as follows. First, pliers 10 are positioned in locating fixture 40 as described above. Locating fixture 40 (with pliers 10) is aligned with holding fixture 42 such that channel 90 and alignment pins 92 of the alignment mechanism 86 on locating fixture 40 are aligned with base portions 118, 120 and alignment holes 122 of holding fixture 42. As locating fixture 40 and holding fixture 42 are aligned, handles portion 18 passes through an opening 150 between self-centering jaws 110, 114. When locating fixture 40 and holding fixture 42 have been properly aligned, handles portion 18 of first half 12 is positioned between the jaws 134, 136 of first non-synchronous gripping device 130, while handles portion 18 of both halves 12,14 and jaws 134, 136 are positioned between jaws 138, 140 of second non-synchronous gripping device 132. As noted above, the relative alignment of handles portion 18 and jaws 134, 136, 138, 140 are shown in FIG. 10.

After locating fixture 40 and holding fixture 42 are properly aligned and pliers 10 is positioned as described above, self-centering jaws 110, 114 are actuated. As described above, gripping pad 112 contacts large diameter rivet head 17, while gripping pad 116 contacts the opposite (small) rivet head (not shown). Because of the self-centering capabilities of jaws 110, 114, "floating" locating surface 80 allows pliers 10 to be moved slightly in the Z-direction in locating fixture 40 as jaws 110, 114 grasp the pliers 10. After jaws 110, 114 have clamped pliers 10, gripping surface 22 is properly positioned and secured in the Y and Z-directions.

After jaws 110, 114 have clamped pliers 10, jaws 134, 136 of first non-synchronous gripping device 130 are actuated in the directions of arrows 164, 166 (see FIG. 10) to grip handle portion 18 of pliers half 12 (attached to rivet 16). Because the position of handle portion 18 is rigidly secured by locating fixture 40, pliers half 12 is unable to be moved. As jaws 134, 136 approach pliers half 12, jaws 134, 136 comply to the position of pliers half 12. Once gripped by first non-synchronous gripping device 130, first half 12 (including gripping surface 22) of pliers 10 is unable to be moved. Gripping surface 22 is now properly positioned and secured in the X-direction, as well as the Y and Z-directions.

After first non-synchronous gripping device 130 has secured first half 12, clamp 70 on locating fixture 40 is released and locating fixture 40 is removed from pliers 10. With locating fixture 40 removed, second half 14 of pliers 10 is free to rotate about rivet 16. Jaws 138, 140 of second non-synchronous gripping device 132 are then actuated in the directions of arrows 168, 170. As noted above, the position of jaws 134, 136 has been previously fixed. Thus, jaw 140 cannot move after it has contacted jaw 136. Jaw 138 continues to advance in the direction of arrow 168. As jaw 138 advances, pliers half 14 rotates about rivet 16 until gripping surface 24 meets gripping surface 22, closing pliers 10. In this manner, non-synchronous griping mechanisms 130, 132 have maintained gripping surface 22 in a known position while complying with the unknown position of handles portion 18.

After pliers 10 are located, closed and held, as described above, holding fixture 42 is rotated and gripping portion 20 is moved into contact with a grinder 200 (see, FIG. 8) such that tapered surface 30 is ground. After the grinding has been completed, the rotation of holding fixture 42 is stopped, non-synchronous gripping devices 130, 132 are released, self-centering jaws 110, 114 are released, and finished pliers 10 are removed from the holding fixture 42.

Second Embodiment of the Invention

Figure 11:
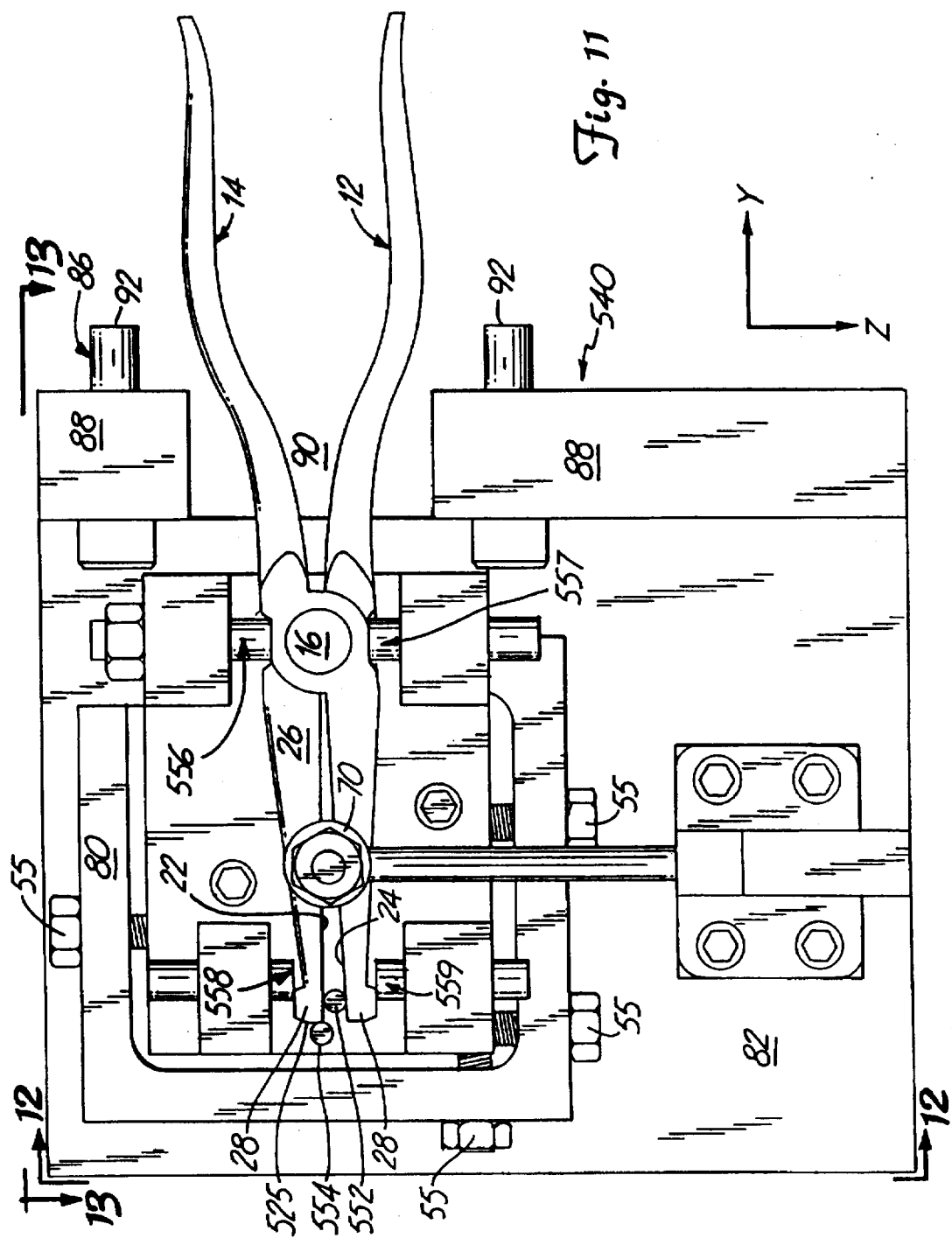
FIG. 11 is a top plane view of an alternative embodiment of the locating fixture of the present invention with the pliers positioned in the locating fixture.
Figure 12:
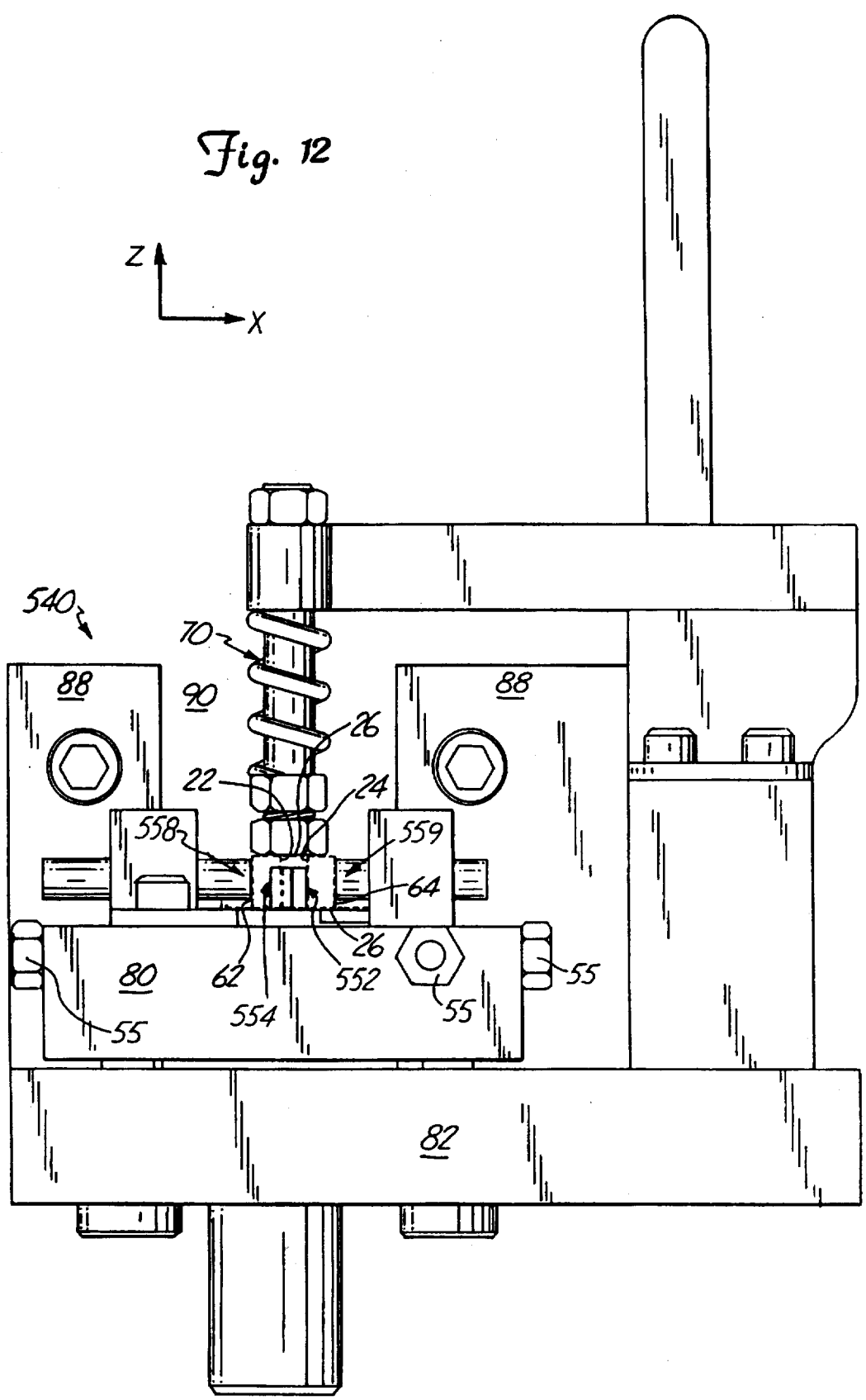
FIG. 12 is a front elevational view of the alternative embodiment of the locating fixture of FIG. 11, taken along lines 12—12 in FIG. 11.
Figure 13:
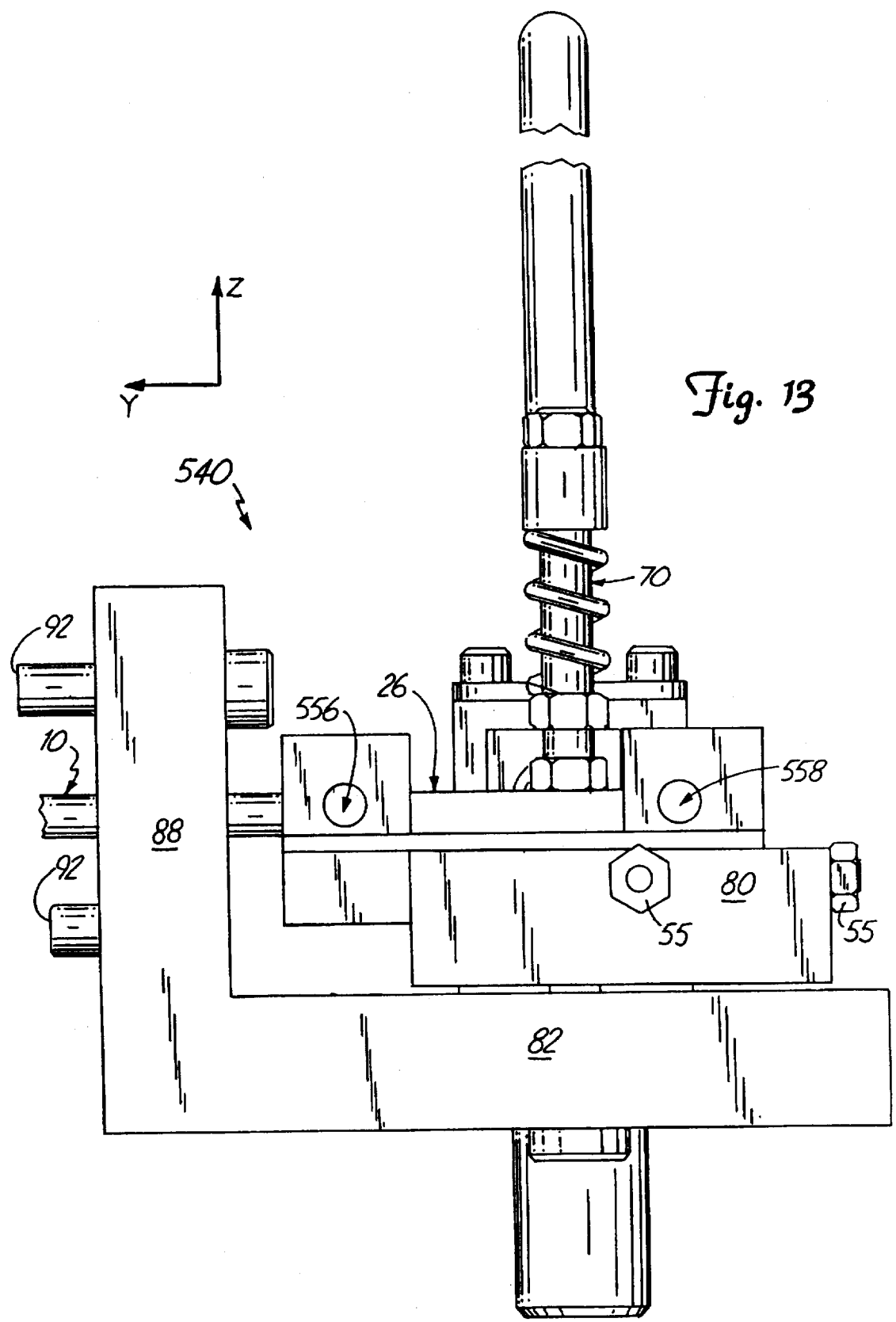
FIG. 13 is a side elevational view of the alternative embodiment of the locating fixture of FIG. 11, taken along lines 13—13 in FIG. 11.
Figure 14:
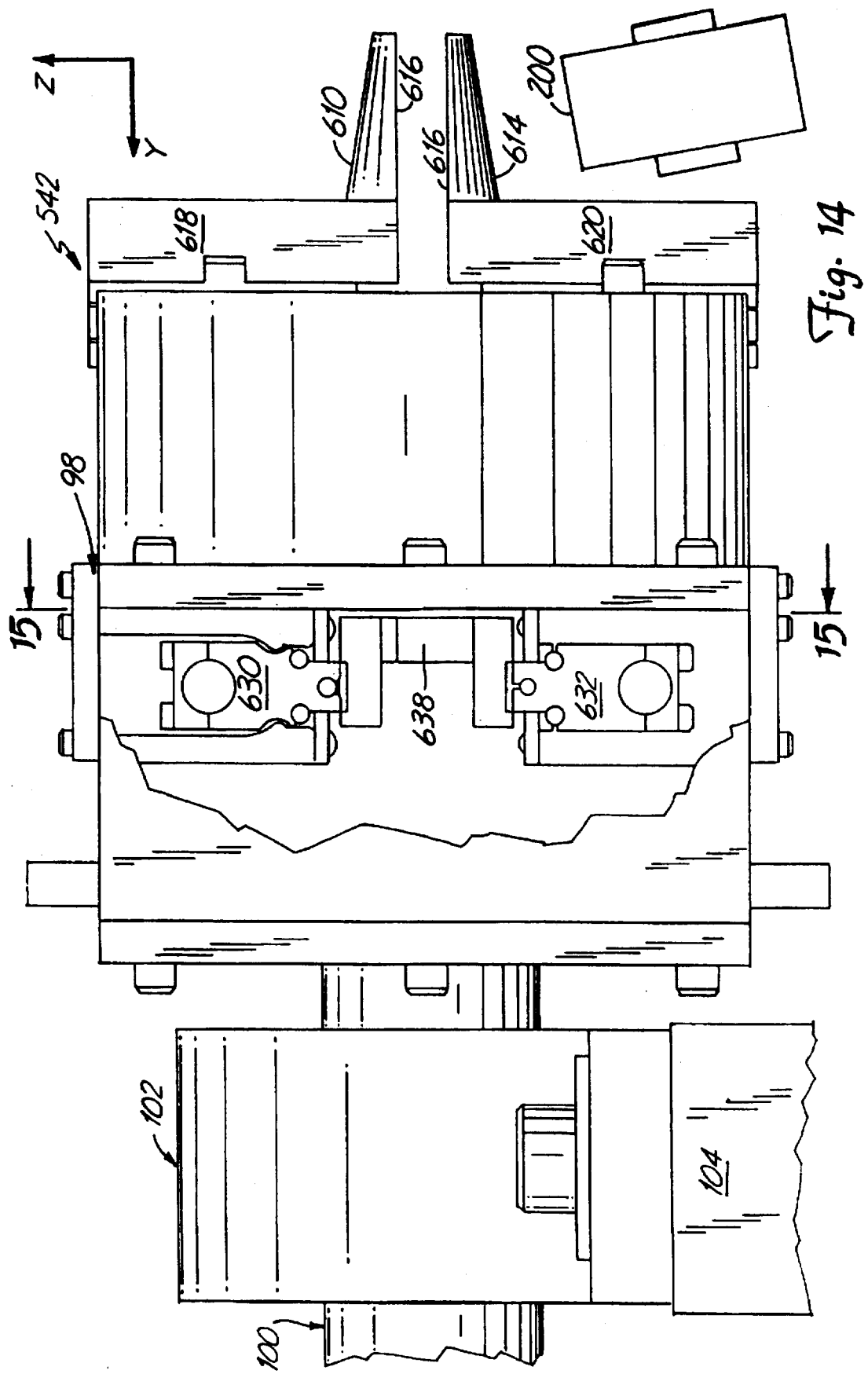
FIG. 14 is a side elevation view of an alternative embodiment of the holding fixture of the present invention.
Figure 15:
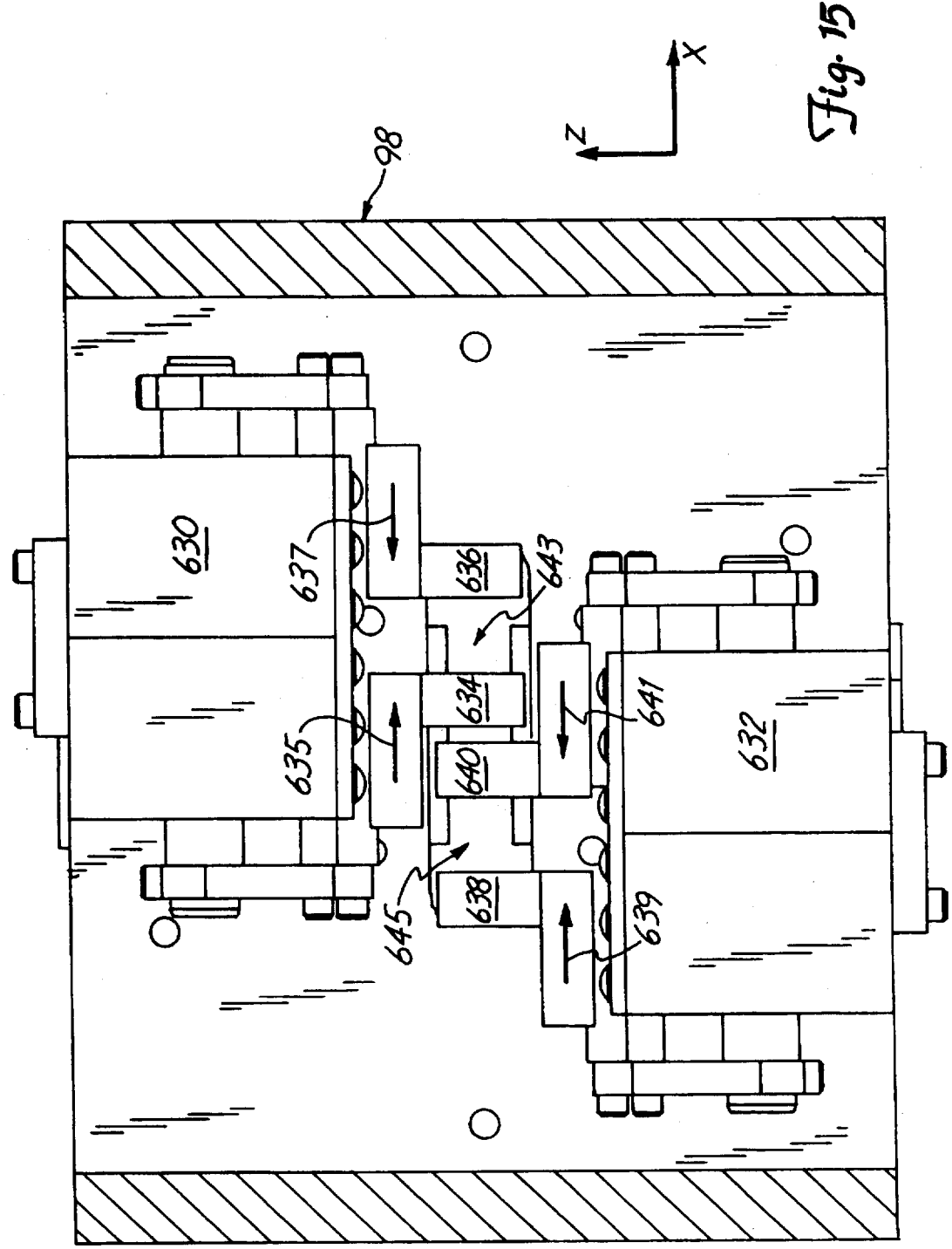
FIG. 15 is a sectional view of the alternative holding fixture of the present invention taken along lines 15—15 of FIG. 14.

A second and preferred embodiment of the apparatus of the present invention is seen in FIGS. 11–15. The second embodiment is similar to the first embodiment described above and includes a locating fixture 540 as seen in FIGS. 11-13 and a holding fixture 542 as seen in FIGS. 14-15. As with the first embodiment, locating fixture 540 locates gripping portion 20 of pliers 10 while handles portion 18 is transferred into holding fixture 542. Holding fixture 542 holds and rotates pliers 10 while tapered surface 30 on gripping portion 20 is ground. As with the first embodiment, it is also within the scope of the present invention that holding fixture 542 holds pliers 10 static while a suitable grinding apparatus forms tapered surface 30.

Locating fixture 540 uses known reference surfaces on gripping portion 20 to accurately locate pliers 10. In particular, locating fixture 540 uses parallel ground surfaces 26, gripping surface 22, and end 525 of pliers half 12. An X, Y, Z coordinate system, as used in describing the first embodiment, is shown in the FIGS. and is used as a directional reference in the description of the invention.

Pliers 10 are seen positioned in locating fixture 540 in FIG. 11. Locating fixture 540 is similar to locating fixture 40 of the first embodiment of the present invention. Locating fixture 540 includes a first locating surface 552 which orients gripping surface 22 in the X-direction, and a second locating surface 554 which orients gripping surface 22 in the Y-direction. Locating surfaces 552 and 554 are preferably dowel pins, and locating surface 552 is removable from locating fixture 540. Second locating surface 554 contacts end 525 of pliers half 12, such that when end 525 abuts locating surface 554 of pliers 10, pliers 10 are properly located in the Y-direction.

As with the first embodiment of the invention, the orientation of locating surfaces 552, 554 may be adjusted using adjustment bolts 55. Preferably, the orientation of locating surfaces 552, 554 is set to a predetermined position using adjusting bolts 55, and then bolts 55 are permanently secured such that the orientation of locating surfaces 552, 554 cannot be altered.

To maintain pliers 10 in locating fixture 540 as described above, pliers 10 are held in position by force devices 556, 557, 558, 559 and clamp 70. Force devices 556, 557, 558 and 559 are preferably jack screws, but other suitable force devices may be used. Force devices 556, 557 are opposingly positioned and perpendicularly aligned with rivet 16, while force devices 558, 559 are opposingly positioned adjacent backing pieces 28 of pliers 10, as seen in FIG. 11. When pliers 10 have been properly positioned adjacent the locating surfaces 552, 554 and upon actuation of force devices 556, 557, 558 and 559, pliers 10 are held securely in the X-direction and the Y-direction. The method of securing pliers 10 using force devices 556, 557, 558 and 559 is described in greater detail below.

After pliers 10 have been loaded into the loading fixture 540, spring backed clamp 70 is actuated and pushes down on parallel ground sides 26 of pliers 10 midway of the gripping portion 20. In this regard, the second embodiment of the invention functions identically to the first embodiment of the invention described above. As best seen in FIG. 12, clamp 70 contacts parallel ground sides 26 of both plier halves 12 and 14 (shown phantom). Located directly under clamp 70 is "floating" locating surface 80 on which pliers 10 are resting. The above described locating surfaces 552, 554 and force devices 556, 557, 558 and 559 are mounted on floating locating surface 80. As described earlier for the first embodiment of the invention, the surface 80 is slidably connected to base 82 such that the surface 80 can move (e.g., "float") only in the Z-direction. After clamp 70 is forced against pliers 10, pliers 10 are held securely in place against floating surface 80 and locating surfaces 552, 554. At the same time, floating surface 80 is allowed to make small movements in the Z-direction such that pliers 10 are able to move in the Z-direction slightly as they are loaded into holding fixture 542 as described below.

As described for the first embodiment of the present invention, locating fixture 540 must be properly aligned with holding fixture 542. To properly position locating fixture 540 relative to holding fixture 542, alignment mechanism 86 is provided on locating fixture 540. Alignment mechanism 86 is identical to that described for the first embodiment of the invention and includes wall 88 extending in the Z-direction from base 82. Channel 90 extends through wall 88 and provides space for handles portion 18 of pliers 10 to extend through wall 88. Alignment pins 92 extend from wall 88 to engage mating portions of holding fixture 542.

In operation, pliers 10 are positioned such that end 525 of pliers half 12 contacts locating surface 554 and gripping surface 22 contacts locating surface 552. Force devices 556, 557 are advanced toward pliers 10 such that rivet 16 is properly positioned in the X-direction. In practice, it may be preferable to fix the position of force device 556 such that only force device 557 advances to secure pliers 10. At this point, the position of rivet 16 is secured in the X and Y directions, and gripping surface 22 is contacting locating surface 552.

Next, force device 558 is advanced such that gripping surface 22 is forced securely against locating surface 552. Locating surface 552 is then removed from floating surface 82. Force device 559 is then actuated. The movement of force device 559 causes gripping surface 24 to be moved toward gripping surface 22 until pliers 10 are closed. At this point, pliers 10 are held securely in the closed position by force devices 556, 557, 558 and 559, and the location of the mating gripping surfaces 22, 24 are known in both the X and Y-directions. Clamp 70 is actuated to contact parallel ground sides 26 of pliers 10 and hold pliers 10 securely against floating surface 80. Pliers 10 are now securely held in locating fixture 540 and the position of mating gripping surfaces 22, 24 are known. The pliers 10 are now ready to be transferred to holding fixture 542.

Holding fixture 542 is illustrated in FIGS. 14–15. As noted above, holding fixture 542 functions to hold and rotate pliers 10 while tapered surface 30 is ground gripping portion 20. Alternatively, holding fixture 542 may hold pliers 10 static while a grinding apparatus forms tapered surface 30. As best seen in FIG. 14, holding fixture 542 is similar to holding fixture 42 of the first embodiment of the invention. Holding fixture 542 includes body 98 which is attached to rotating shaft 100. Shaft 100 is supported bearing journal 102 and base 104. Shaft 100 and body 98 are rotated by a motor (not shown).

Holding fixture 542 has two self-centering jaws 610, 614. Self-centering jaws 610, 614 have base portions 618, 620, respectively. Base portions 618, 620 cooperatively engage alignment mechanism 86 of locating fixture 540. Specifically, base portions 618, 620 are sized to fit in channel 90 of alignment mechanism 86, such that locating fixture 540 is caused to be properly aligned with holding fixture 542. Holding fixture 542 includes alignment holes 122 identical to those in holding fixture 42 which are positioned to mate with alignment pins 92 on locating fixture 540 to further aide in properly positioning locating fixture 540 relative to holding fixture 542. Collectively, base portions 618, 620 and alignment holes 122 act as an alignment mechanism on holding fixture 542 for aligning holding fixture 542 and locating fixture 540.

Self-centering jaws 610, 614 have flat gripping surfaces 616 adapted to clamp on parallel ground sides 26 of pliers 10 adjacent rivet 16. Thus, self-centering jaws 610, 614 are similar to self-centering jaws 110, 114 of the first embodiment of the invention, with the self-centering jaws 610, 614 lacking only the gripping pads 112, 116 found in the first embodiment of the invention. By providing flat gripping surfaces 616, rather than gripping pads 112, 116, self-centering jaws 610, 614 may be used with multiple types of pliers, not just those with small and large rivet heads having diameters matching the sizes of gripping pads 112, 116. In addition, the gripping area provided by gripping surfaces 616 is much larger than that provided by gripping pads 112, 116. Thus, the flat gripping surface 616 provides greater holding power than self-centering jaws 110, 114 having gripping pads 112, 116.

Mounted within body 98 of holding mechanism 542 are a first non-synchronous gripping device 630 and a second non-synchronous gripping device 632. The non-synchronous gripping devices 630, 632 are the type described for the first embodiment of the present invention, manufactured by Zaytran Inc. of Elyria, Ohio 44036.

Figure 16:
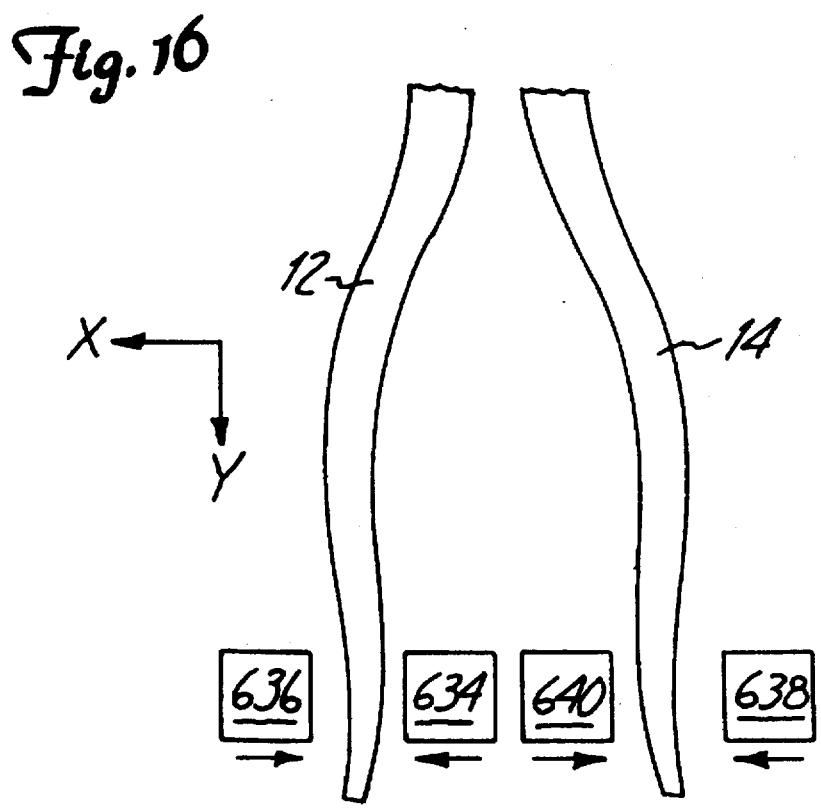
FIG. 16 is a schematic of the holding fixture of an alternate embodiment of the present invention showing the relative positions of the gripping jaws and the pliers.
Figure 4:
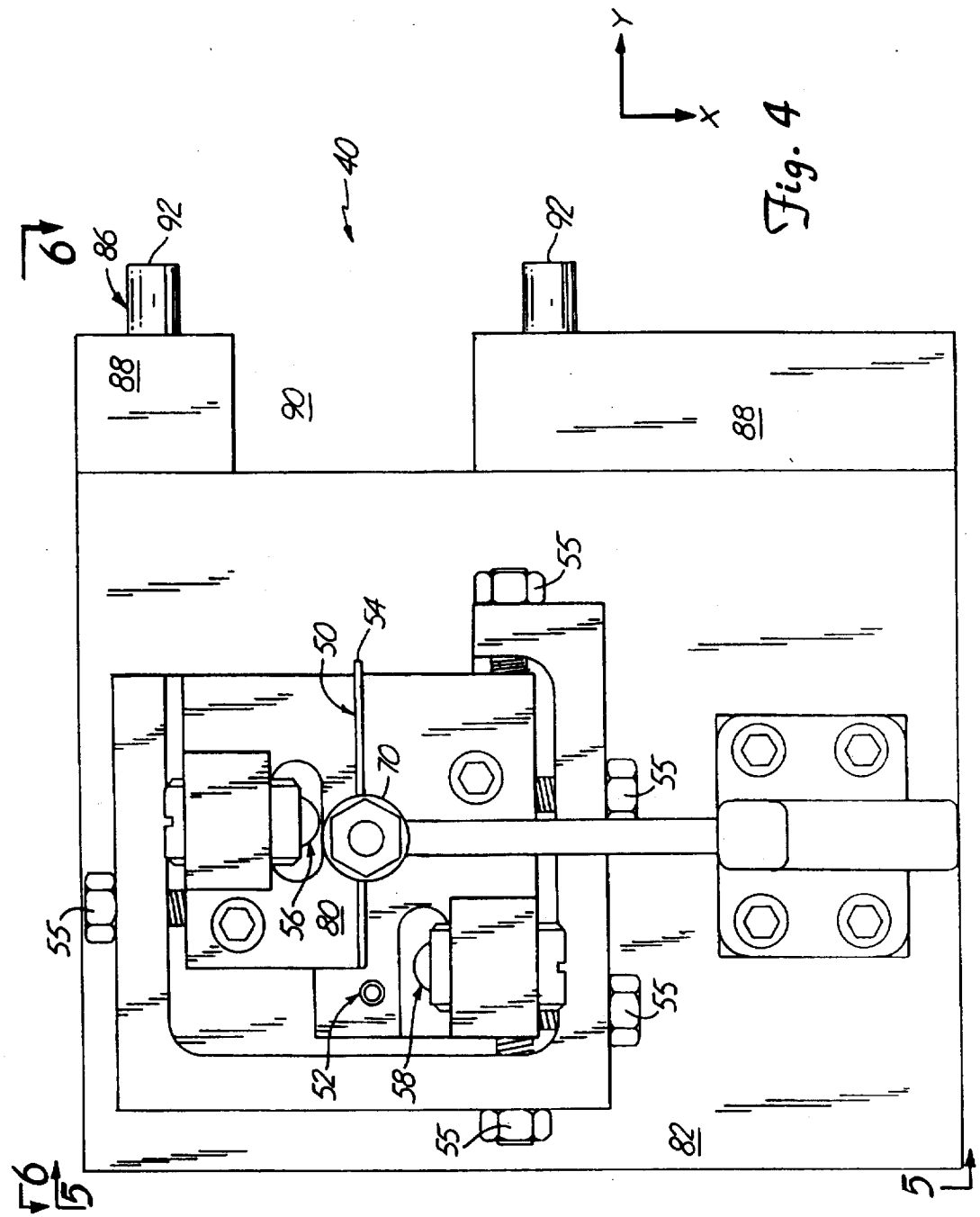
FIG. 4 is a top plane view of the locating fixture of the present invention.
Figure 5:
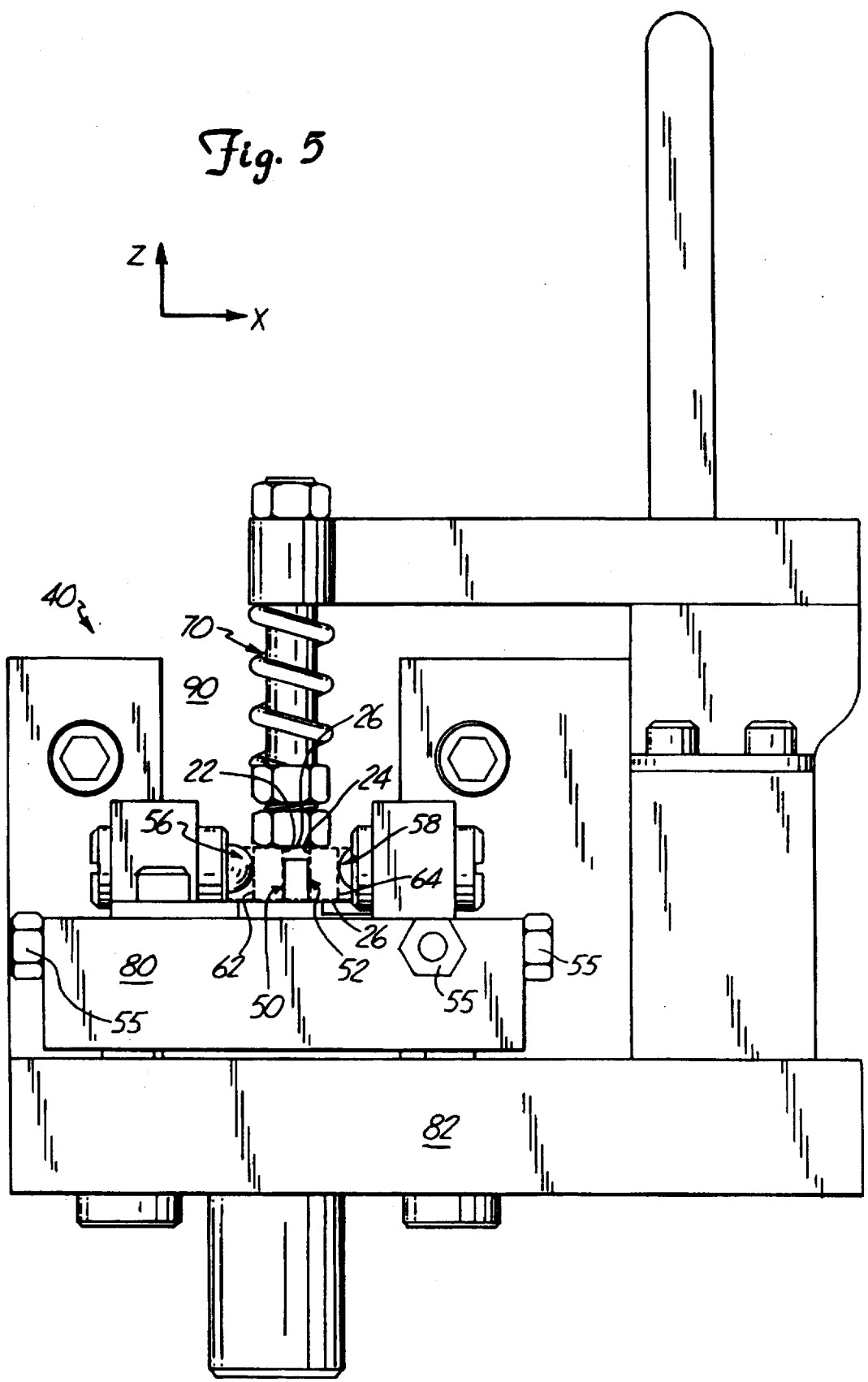
FIG. 5 is a front elevational view of the locating fixture of the present invention, taken along lines 5—5 in FIG. 4.
Figure 6:
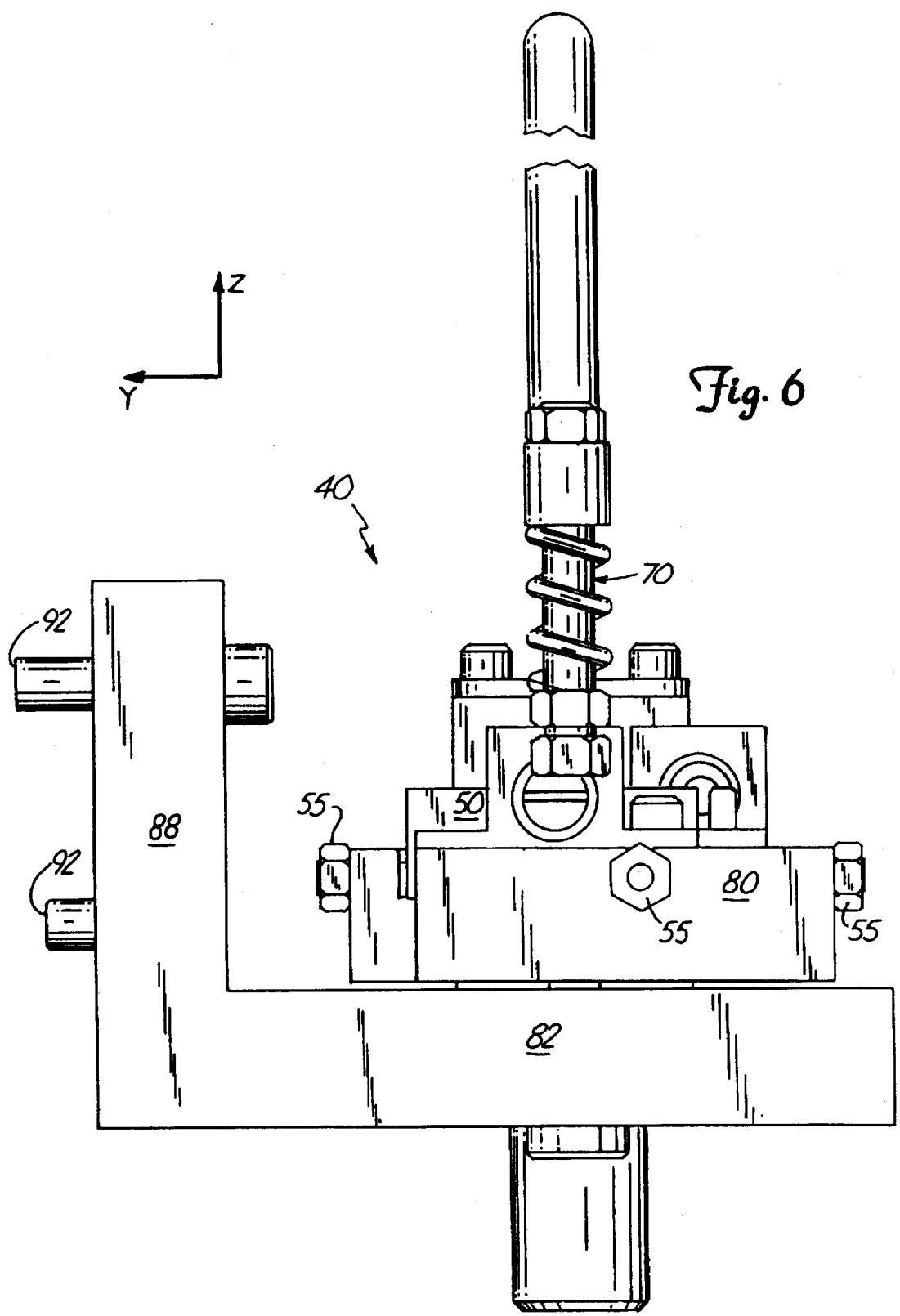
FIG. 6 is a side elevational view of the locating fixture of the present invention, taken along lines 6—6 in FIG. 4.

As best seen in FIGS. 15 and 16, first non-synchronous gripping device 630 includes jaws 634, 636, and second non-synchronous gripping device 632 includes jaws 638, 640. Non-synchronous gripping devices 630, 632 are positioned such that jaws 634, 636 of first non-synchronous gripping device 630 are positioned to grasp handles portion 18 of pliers half 12 (in space 643), while jaws 638, 640 of second non-synchronous gripping device 632 are positioned to grip handles portion 18 of pliers half 14 (in space 643). Jaws 634, 636, 638, 640 move in the direction of arrows 635, 637, 639, 641, respectively, such that when actuated jaws 634, 636 conform to the position of handles half 12 in space 643, and jaws 638, 640 conform to the position of handles half 14 in space 645. Non-synchronous gripping devices 630, 632 are powered by hydraulic lines (not shown) which are selectively controlled to operate gripping devices 630, 632.

In operation, pliers 10 are placed into locating fixture 540 as described above. Locating fixture 540 is then aligned with holding fixture 542 such that channel 90 and alignment pins 92 of the alignment mechanism 86 on locating fixture 540 are aligned with base portions 618, 620 and alignment holes 122 of holding fixture 542. As locating fixture 540 and holding fixture 542 are aligned, handles portion 18 passes through opening 150 between self-centering jaws 610, 614. When locating flare 540 and holding fixture 542 are properly aligned, handles portion 18 of first half 12 is positioned in space 643 between jaws 634, 636 of first non-synchronous gripping device 630, while handles portion 18 of second half 14 is positioned in space 643 between jaws 638, 640 of second non-synchronous gripping device 632.

Self-centering jaws 610, 614 are actuated and gripping surfaces 616 of jaws 610, 614 are moved into contact with parallel ground surfaces 26 of pliers 10. The self-centering capabilities of jaws 610, 614 move locating surface 80 slightly in the Z-direction, if required, to locate pliers 10 properly in the Z-direction. The intersection of gripping surfaces 22, 24 is now properly positioned and secured in the X, Y and Z directions. First non-synchronous gripping device 630 and second non-synchronous gripping device 632 are actuated to cause handles portion 18 of both halves 12, 14 to be secured. Clamp 70, as well as force devices 556, 557, 558, 559 are released and locating fixture 540 is removed from pliers 10 (now secured by holding fixture 542). Holding fixture 542 may now be rotated and gripping portion 20 moved into contact with a grinder (200(see FIG. 14) such that tapered surface 30 is formed. After tapered surface 30 has been formed, non-synchronous gripping devices 630, 632 are released, self-centering jaws 610, 614 are released, and finished pliers 10 are removed from holding fixture 542.

Although the present invention has been described with reference to preferred embodiments, workers skilled in the art will recognize that changes may be made in form and detail without departing from the spirit and scope of the invention.

What is claimed is:

1. An apparatus for accurately grinding needle-nose pliers, the pliers of the type having a first pivoting portion and a second pivoting portion, the first and second pivoting portions each having a handle end and a gripping end, wherein the position of the handle end of each pivoting portion varies within a predetermined range relative to each respective gripping end, the first and second pivoting portions connected pivotally to each other by a rivet at a point between the handle end and the gripping end of each pivoting portion, the gripping end of each pivoting portion having a gripping surface, the gripping surface of the first portion and the gripping surface of the second portion opposingly positioned and machined parallel to create finished gripping surfaces, the apparatus comprising:

a first fixture adapted to locate the pliers from the gripping end of the pliers, the first fixture having a locating surface for contacting the gripping surface of the first pivoting portion, the first fixture further having a force mechanism to maintain the first gripping surface in contact with the locating surface;

a second fixture adapted to hold and rotate the pliers while a tapered surface on the gripping end is being ground, the second fixture having two self-centering jaws adapted to clamp on the rivet pivotally connecting the first portion and the second portion of the pliers, a first non-synchronous gripping device adapted to grip the handle end of the first pivoting portion, and a second non-synchronous device adapted to grip the handle end of the first and second pivoting portions, thereby preventing any motion of the pliers within the second fixture;

alignment means for aligning the first fixture with the second fixture, whereby the pliers may be transferred from the first fixture to the second fixture when the first and second fixtures are aligned; and grinding means for forming a tapered surface on the gripping end of the pliers.

2. The apparatus of claim 1, wherein the grinding means comprises a coated abrasive.

3. The apparatus of claim 1, wherein the grinding means comprises a bonded abrasive.

4. A method for accurately machining a work piece having a first portion with a known and accurate reference surface and a second portion not containing the reference surface, wherein the position of the second portion varies within a predetermined range relative to the reference surface, the method comprising:

providing a first fixture for receiving a work piece having a known and accurate reference surface, the first fixture having at least one locating surface, the locating surface adapted to contact the reference surface of the work piece such that the position of the reference surface relative to the first fixture is known, the first fixture configured to securely hold the work piece so that the reference surface remains in contact with the locating surface, and a portion of the work piece not containing the reference surface extends beyond the first fixture;

providing a second fixture having at least one non-synchronous gripping mechanism for gripping the work piece;

positioning the work piece in the first fixture such that the reference surface contacts the locating surface and the work piece is securely held in the first fixture;

aligning the first fixture with the second fixture, such that the portion of the work piece which extends beyond the first fixture extends into the second fixture and is received by the non-synchronous gripping mechanism of the second fixture;

gripping the portion of the work piece with extends into the second fixture with the non-synchronous gripping mechanism such that the position of the reference surface relative to the second fixture is fixed and the work piece is prevented from moving within the second fixture;

releasing the first fixture from the work piece;

performing a desired material removal operation on the portion of the work piece previously held by the first fixture.

5. The method of claim 4, wherein performing a desired machining operation comprises grinding the work piece.

6. An apparatus for accurately grinding needle-nose pliers, the pliers of the type having a first pivoting portion and a second pivoting portion, the first and second pivoting portions each having a handle end and a gripping end, wherein the position of the handle end of each pivoting portion varies within a predetermined range relative to each respective gripping end, the first and second pivoting portions connected pivotally to each other by a rivet at a point between the handle end and the gripping end of each pivoting portion, the gripping end of each pivoting portion having a gripping surface, the gripping surface of the first portion and the gripping surface of the second portion opposingly positioned and machined parallel to create finished gripping surfaces, the apparatus comprising:

a first fixture adapted to locate the pliers from the gripping end of the pliers, the first fixture having a locating surface for contacting the gripping surface of the first pivoting portion, the first fixture further having a force mechanism to maintain the first gripping surface in contact with the locating surface;

second fixture adapted to hold and rotate the pliers while a tapered surface on the gripping end is being ground, the second fixture having two self-centering jaws adapted to clamp on the pliers adjacent the rivet pivotally connecting the first portion and the second portion of the pliers, a first non-synchronous gripping device adapted to grip the handle end of the first pivoting portion, and a second non-synchronous device adapted to grip the handle end of the second pivoting portion, thereby preventing any motion of the pliers within the second fixture;

alignment means for aligning the first fixture with the second fixture, whereby the pliers may be transferred from the first fixture to the second fixture when the first and second fixtures are aligned; and grinding means for forming a tapered surface on the gripping end of the pliers.

* * * * *

UNITED STATES PATENT AND TRADEMARK OFFICE
CERTIFICATE OF CORRECTION

PATENT NO. : 5,727,988
DATED : March 17, 1998
INVENTOR(S) : Luedeke et al.

It is certified that error appears in the above-identified patent and that said Letters Patent is hereby corrected as shown below:

Column 3, line 37, after "1" insert --A--.

Column 5, line 46, after "surface" delete --10--.

Column 6, line 39, before "journal" replace "beating" with --bearing--.

Column 10, line 57, after "locating" replace "flare" with --fixture--.

Column 11, line 10, before "200" delete --(--.

Signed and Sealed this

Fourteenth Day of July, 1998

Attest:

BRUCE LEHMAN

Attesting Officer            Commissioner of Patents and Trademarks